(12) United States Patent
Brophy et al.

(10) Patent No.: US 6,616,108 B1
(45) Date of Patent: Sep. 9, 2003

(54) ERGONOMIC SUPPORT FOR USE WITH A COMPUTER INPUT DEVICE

(75) Inventors: Tim Brophy, Menlo Park, CA (US); Eric Ronberg, San Mateo, CA (US); Donald G. Varga, San Francisco, CA (US)

(73) Assignee: Acco Brands, Inc., Lincolnshire, IL (US)

( * ) Notice: Subject to any disclaimer, the term of this patent is extended or adjusted under 35 U.S.C. 154(b) by 0 days.

(21) Appl. No.: 09/886,173

(22) Filed: Jun. 18, 2001

(51) Int. Cl.[7] ................................................. B43L 15/00
(52) U.S. Cl. .................................. 248/118.1; 248/118.5
(58) Field of Search ............................. 248/118, 118.1, 248/118.3, 118.5, 918; 400/715; 345/156

(56) References Cited

U.S. PATENT DOCUMENTS

| | | | | |
|---|---|---|---|---|
| 5,165,630 A | * | 11/1992 | Connor ..................... | 248/118.1 |
| 5,340,067 A | * | 8/1994 | Martin et al. ............ | 248/118.5 |
| 5,788,195 A | * | 8/1998 | Rice ......................... | 248/118.5 |
| 5,820,085 A | * | 10/1998 | Paulse et al. ............ | 248/118.5 |
| 5,868,365 A | * | 2/1999 | Hesley ....................... | 248/118 |
| 5,913,497 A | * | 6/1999 | Myers ....................... | 248/118.5 |
| 6,129,318 A | * | 10/2000 | Paulse ....................... | 248/118.3 |
| 6,157,370 A | * | 12/2000 | Kravtin et al. ............ | 345/163 |
| 6,193,196 B1 | * | 2/2001 | Hesley ....................... | 248/118.1 |

* cited by examiner

Primary Examiner—Ramon O. Ramirez
Assistant Examiner—Kofi Shulterbrandt
(74) Attorney, Agent, or Firm—Townsend and Townsend and Crew LLP

(57) ABSTRACT

An ergonomic support is disclosed for use with a computer input device such as a mouse. Some embodiments allow the same support to be used with a wide range of mouse sizes. Some embodiments allow a user to make a customized fit between the user's hand, the support and the input device. Many embodiments include a deformable member which continues to apply force to the input device after being deformed by a user, thereby coupling the support to the input device without the need for external fasteners. In other embodiments, an attachment member couples the input device to a recessed area of the support.

51 Claims, 13 Drawing Sheets

ERGONOMIC SUPPORT FOR USE WITH A COMPUTER INPUT DEVICE

BACKGROUND OF THE INVENTION

The invention relates generally to the field of computer accessories and particularly to ergonomic supports for use with a computer "mouse" or a similar input device.

DESCRIPTION OF RELATED ART

A "mouse" is a well-known type of input device for a personal computer. Because a mouse (or similar input device) enables intuitive "point and click" interaction with text and objects displayed on a computer screen, the use of such devices has gained widespread popularity.

A variety of devices have been developed to provide additional comfort to users while they are using a mouse ("mousing"). These devices include stationary "wrist rests" which are typically positioned on one edge of a mouse pad. Although wrist rests can alleviate some of the muscle fatigue which may be caused by mousing, stationary devices such as wrist pads can interfere with the free movement of the user's hand and of the mouse.

A number of movable supports are available for use with a mouse, but none is fully satisfactory. For example, one commercially available hand device supports a user's hand and wrist while mousing, but does not fit snugly to the mouse. Instead, the mouse is free to move within an opening of the hand support. Some users find that the mouse tends to migrate when using this hand support and that they end up struggling to keep the mouse in place. Moreover, some mice are not compatible with this hand support.

A second device attaches to the mouse and is moved with the mouse. However, the second device must be attached with VELCRO™ or similar fasteners, one side of which must be glued to the mouse. This attachment process is inconvenient. Some users may find it unacceptable to attach foreign objects to their mouse, especially because it makes the mouse uncomfortable to grasp if the mouse is used alone. Moreover, the second device cannot accommodate a wide range of mouse shapes and sizes. Accordingly, several different sizes are needed to accommodate various types of mice.

SUMMARY OF THE INVENTION

In view of the limitations of prior art devices, the present application discloses an improved hand and wrist support for use with a mouse or a similar input device. The support of the present invention wraps around at least a portion of the input device and moves with the input device. In some embodiments, the support may be coupled to the input device without using any type of fastener. In some embodiments, the support will substantially return to its original shape when de-coupled from the input device. In some embodiments, at least part of the support is made of deformable material which will retain a desired shape after being deformed by a user. The support may be used with a wide range of input device shapes and sizes.

In one preferred embodiment, the support is formed primarily of cushioning material for cushioning a user's hand and wrist. The cushioning material is coupled to a deformable member to which a user may apply force in order to form a pressure fit against an input device. The deformable member may be made of any convenient deformable material, but is preferably made of plastic or metal.

Some embodiments use attachment members, such as straps, for coupling the support to an input device. In one such embodiment, the attachment member is a strap which wraps around a portion of the input device and is adjustably secured to another portion of the support.

Another preferred embodiment of the present invention includes various methods of forming a customized support for use with a computer input device. One such method includes the steps of disposing an input device in a recessed portion of a support and applying force to deform the support, thereby causing a pressure fit between the support and the input device.

When the deformable material is a shape memory polymer or resin, the support is heated to a temperature above the deformable material's glass transition point, placed next to an input device, deformed to a desired shape which accommodates at least a portion of the input device's shape, then cooled to a temperature below the deformable material's glass transition point in order to preserve the desired shape.

DETAILED DESCRIPTION OF THE PREFERRED EMBODIMENTS

Figure 1:
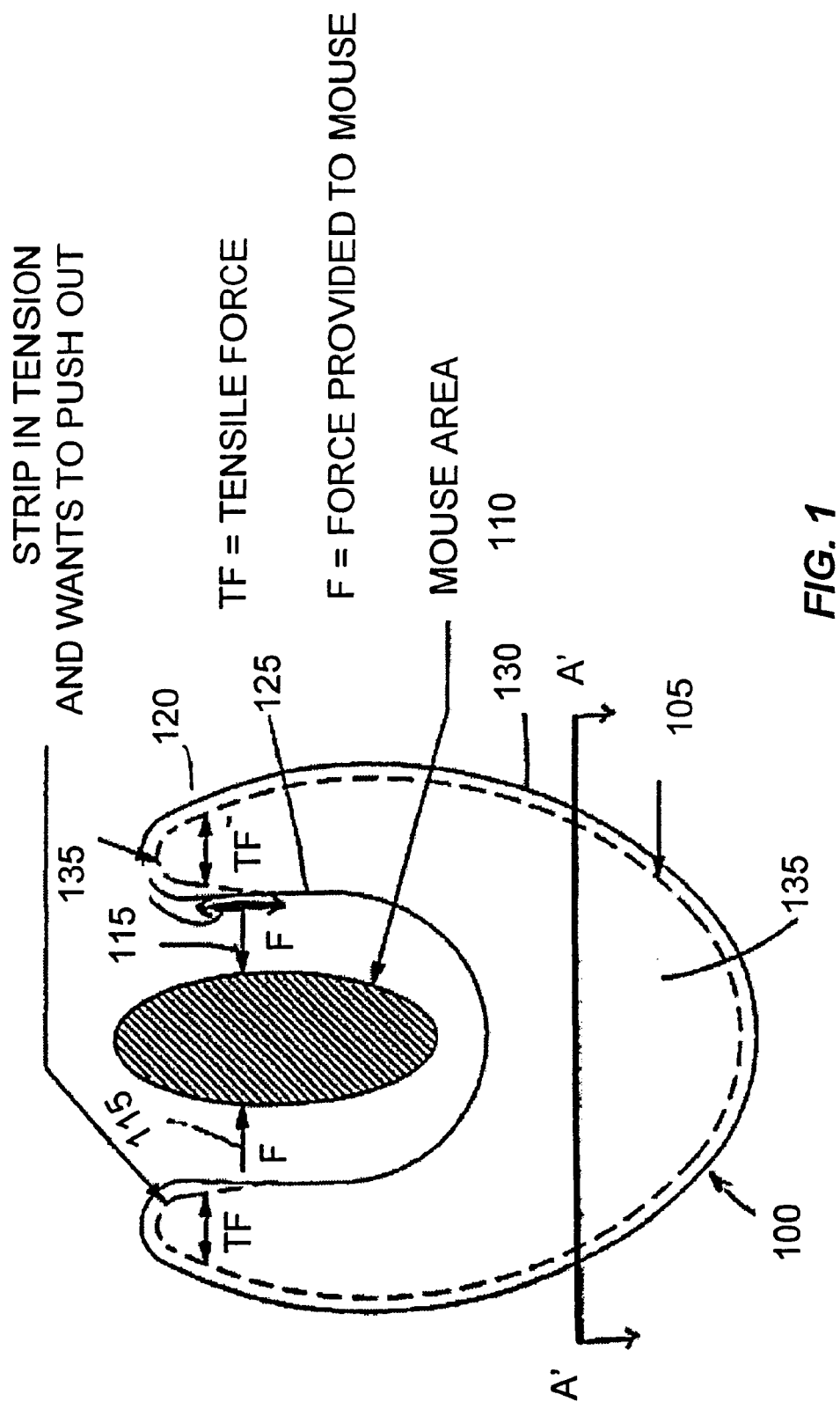
FIG. 1 is a top view illustrating a first embodiment of the present invention.

According to one aspect of the present invention, an adjustable support is provided for use with a computer mouse or similar device. A top view of a first embodiment is depicted in FIG. 1. In this embodiment, support 100 is formed in a horseshoe shape, with a concave portion 125 for accommodating a mouse and a convex portion 130 on an opposing side. Although this embodiment of support 100 is symmetrical, support 100 may also be made asymmetrical.

Deformable strip 105 extends along convex portion 130 but is disposed within cover 135 and need not be visible to a user. In this embodiment, deformable strip 105 also extends along at least part of concave portion 125. A user may readily shape deformable strip 105 and may form a pressure fit between support 100 and mouse 110 by applying force to support 100. For example, a user may shape support 100 by squeezing support 100 in the direction of mouse 110 with a hand which will operate the input device. Deformable strip 105 has a relatively low yield strength, so that the user's squeeze changes the shape of deformable strip 105.

Even after the user stops applying force to support 100, deformable strip 105 continues to exert force 115 on mouse 110. Support 100 may readily be attached to mouse 110 solely by force 115 and the resulting frictional force 135 which develops between mouse 110 and concave portion 125. In this way, the user may pressure fit support 100 to a variety of mouse shapes and to the user's hand.

In this embodiment, deformable strip 105 is preferably formed of a metal such as aluminum, tin, copper, magnesium, steel or titanium. If deformable strip 105 is formed of metal, its preferred dimensions are in the range of 60 to 70 mm in width, 90 to 100 mm in length, 30 to 40 mm in height, and 1.5 to 3.0 mm in thickness.

However, deformable strip 105 may be formed in a variety of sizes and may be made of any material which is easy for a user to deform and which retains its shape after deformation. For example, deformable strip 105 may be formed of graphite or a synthetic material such as PC (polycarbonate), ABS (acrylonitrile-butadiene-styrene), PVC (polyvinyl chloride), PP (polypropylene), styrene, acrylic, or nylon.

Alternatively, deformable strip 105 may be fashioned from a shape memory alloy such as nickel-titanium or a shape memory resin or polymer such as polynorbornene, trans-1, 4-polyisoprene, polyurethane, or the like. Such resins or polymers may be easily formed into arbitrary shapes, for example by injection molding. Shape memory resins have the advantageous property that when they are heated to a temperature above a "glass transition point" or $T_g$, their modulus of elasticity abruptly changes to a rubbery, easily deformable state. If a shape memory resin is heated above $T_g$, deformed from the shape into which it was originally molded into a desired shape and then cooled to a temperature below $T_g$, the shape memory resin's modulus of elasticity abruptly changes. At temperatures below $T_g$, a shape memory resin assumes a more rigid, vitreous state but retains its deformed shape. However, if a shape memory resin is subsequently heated to a temperature above $T_g$, the resin will return to the shape into which it was originally molded.

Shape memory resins can be manufactured with a range of $T_g$ values. If a shape memory resin is used to form part or all of the deformable portion of support 100, the resin's $T_g$ is preferably selected to be at least above 40° C. If the resin's $T_g$ is lower, a user's body heat could cause the shape memory resin to be heated above its glass transition point. If deformable strip 105 is made from a shape memory resin, support 100 may be readily deformed by a user after deformable strip 105 is heated above $T_g$, which is preferably a low enough temperature to avoid discomfort to a user (e.g., 45° to 50° C.). After a user deforms support 100 to a desired shape, deformable strip 105 may be cooled to retain the desired shape. If the user later desires to use support 100 with a different mouse, deformable strip 105 may be heated to above $T_g$, which will cause deformable strip 105 to return to the shape into which it was originally molded.

In order to increase frictional force 135, at least some portions of support 100 which will be in contact with mouse 110 are preferably made of material which has a high coefficient of friction, such as an elastomer (e.g., SBR—styrene-butadiene, neoprene, and urethane) TPR (thermoplastic rubber) or rubber.

Figure 2:
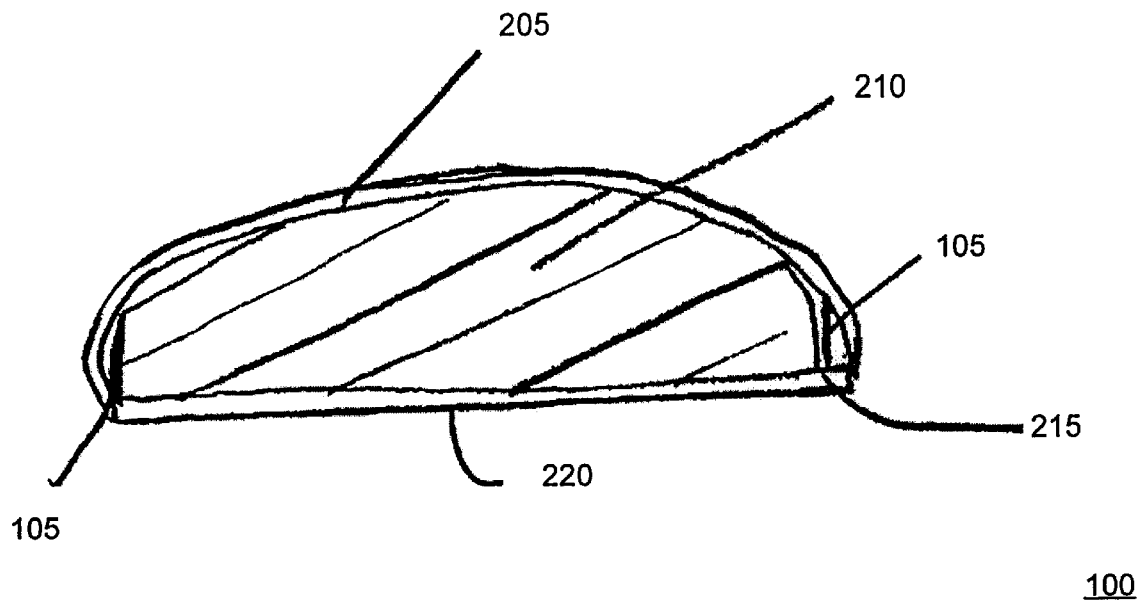
FIG. 2 is a cross-section of the embodiment shown in FIG. 1.

FIG. 2 illustrates a cross-section of the first embodiment of support 100 from the vantage point of cross-section A—A shown on FIG. 1. In this embodiment, cushion 210 occupies most of the volume of support 100. Cushion 210 may be formed of any cushioning material, such as gel or foam, and may or may not be resilient. In one preferred embodiment, cushion 210 is formed of polyurethane. In other embodiments, cushion 210 is made of gel, common dampening foam (low and high density), SBR (styrene-butadiene), and PVC (polyvinyl chloride).

In other embodiments, support 100 is firm and is not filled with cushioning material. Instead, support 100 may be filled with material such as sand, metal filings, grains, beans, clay or other firm material. In such embodiments, support 100 preferably includes a soft cover to increase a user's comfort.

In this embodiment, deformable strip 105 is disposed on the outside of cushion 210, but in other embodiments deformable strip 105 is embedded in cushion 210, situated between cushion 210 and base 215, disposed around base 215 or embedded in base 215. Here, cover 205 and base 215 enclose cushion 210 and deformable strip 105. However, in other embodiments, no cover is used. Cover 205 is preferably formed of a material which "breathes" and is pleasant for a user to touch, such as lycra, leather (synthetic or real), neoprene, vinyl, cotton., velvet, nylon, or Jersey cloth.

Base 215 is smooth on its bottom surface 220, to allow a user to glide support 100 along a mouse pad or other work surface with little effort. In one preferred embodiment, base 215 is made of PC. In other embodiments, base 215 is made of plastic other than PC, of vinyl, or of acrylic. Base 215 may be coated with a low-friction material such as Teflon™. In FIG. 2, base 215 is shown to be continuous across the bottom portion of support 100. However, base 215 may be discontinuous if deformable strip 105 is disposed around, or disposed within, base 215. The discontinuity or discontinuities allow base 215 to avoid resisting the force applied by a user and allows deformable strip 105 to change its shape.

Figure 3:
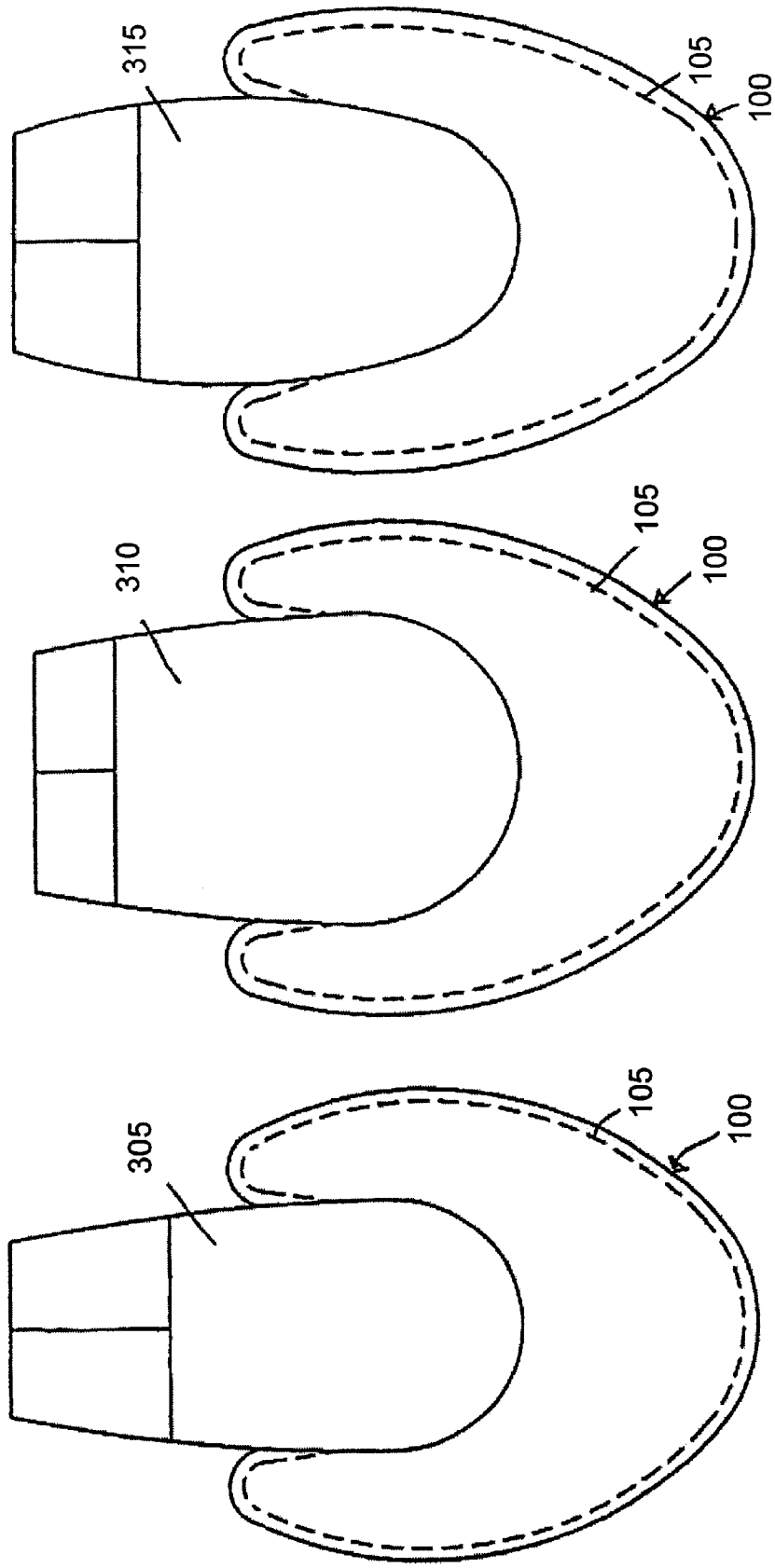
FIG. 3A illustrates how the first embodiment of the present invention may be shaped to fit a standard mouse.
FIG. 3B illustrates how the first embodiment of the present invention may be shaped to fit a fat mouse.
FIG. 3C illustrates how the first embodiment of the present invention may be shaped to fit a thin mouse.

FIGS. 3A, 3B and 3C illustrate support 100 engaged with mice of three different shapes. In FIG. 3A, support 100 has been shaped to fit standard mouse 305. In FIG. 3B, support 100 has been shaped to accommodate fat mouse 310. In FIG. 3C, support 100 has been shaped to fit thin mouse 315.

In FIGS. 3A–3C, support 100 has been shaped by deformation of strip 105. However, a wide variety of alternative embodiments are within the scope of the present invention: any construction of support 100 which allows a user to deform support 100 and make a pressure fit around a computer input device is part of the present invention. Exemplary alternative embodiments are set forth in the following paragraphs.

Figure 4:
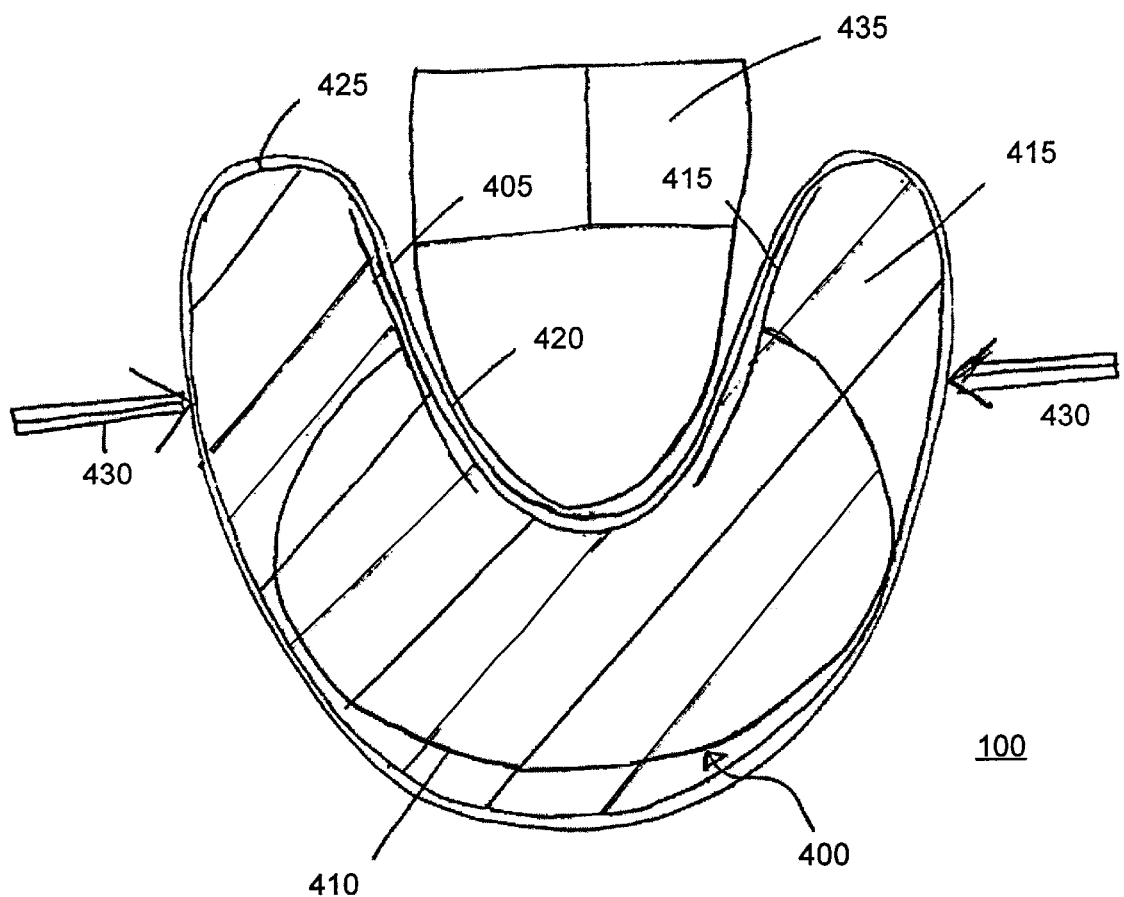
FIG. 4 is a cross-section of a second embodiment of the present invention.

FIG. 4 is a cross-section which illustrates one such alternative embodiment. Here, deformable member 400 includes segments 405 and main portion 410. Main portion 410 is preferably embedded in cushion 415, but may be disposed between cushion 415 and base 450 (not shown) or disposed within base 450. In this embodiment, cover 425 encloses deformable member 400 and cushion 415. When a user applies force 430 to support 100, the shape of deformable member 400 is changed to accommodate at least a portion of mouse 435. Segments 405, which are disposed near concave portion 420 of support 100, are pressed towards mouse 435, making a pressure fit to hold mouse 435 in place. As noted above, if deformable member 400 is formed of a shape memory polymer or resin, deformable member 400 should be heated above its $T_g$ prior to deformation and cooled after deformation to retain its shape.

Figure 5:
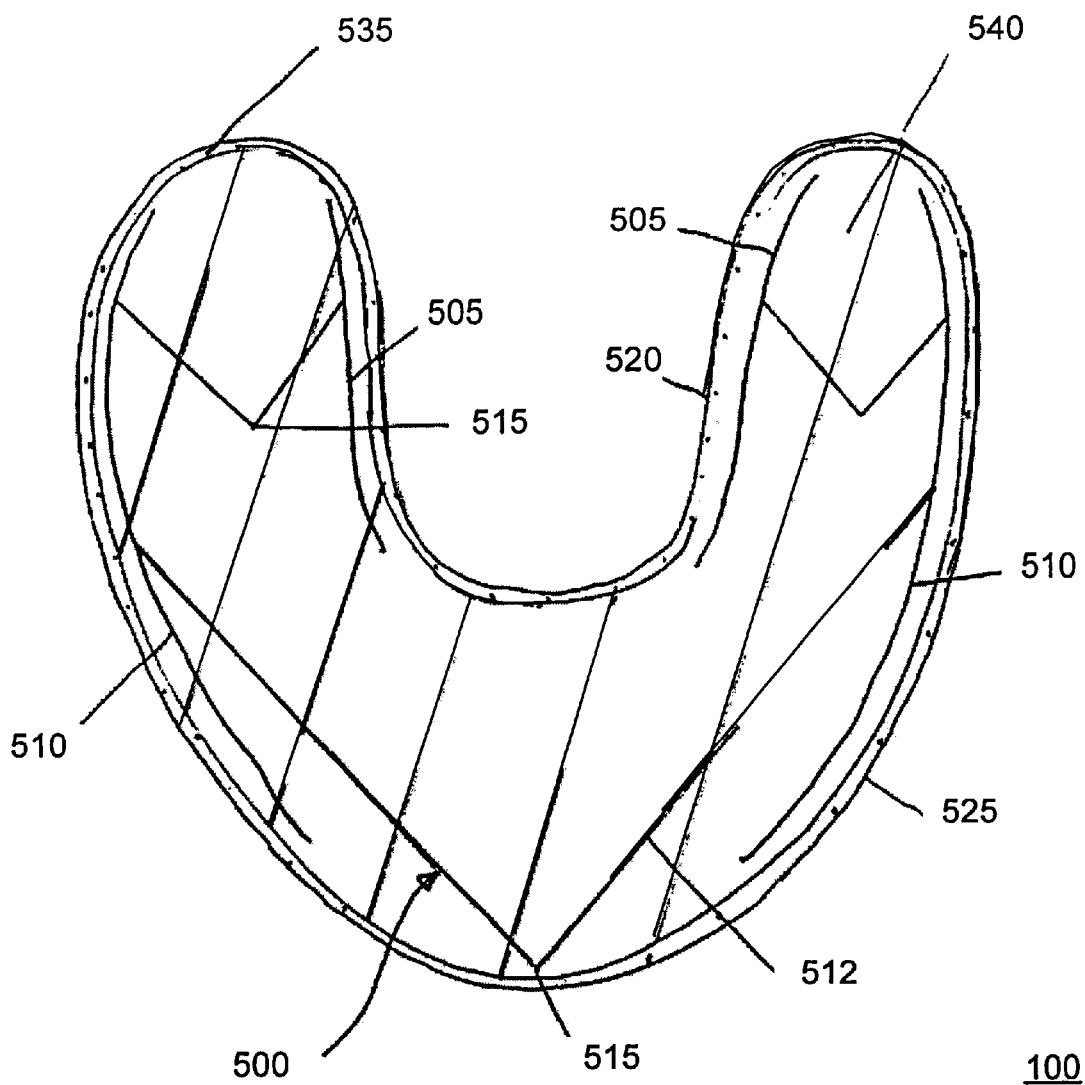
FIG. 5 is a cross-section of a third embodiment of the present invention.

FIG. 5 illustrates another embodiment of support 100 which is suitable for all types of deformable member 500 but particularly advantageous if deformable member 500 is made of metal, such as aluminum, copper, tin, titanium or steel. Here, deformable member 500 includes interior segments 505, which are disposed along at least a part of concave portion 520, and exterior segments 510, which are disposed along at least part of convex portion 525.

Medial segments 512 connect interior segments 505 and exterior segments 510. Although three medial segments 512 are shown in FIG. 5, this number is purely illustrative; any convenient number of medial segments 512 may be used. Medial segments 512 preferably include at least one prestressed portion 515, which has been stressed above the yield strength of medial segments 512. Pre-stressed portions 515 allow a user to deform medial segments 512 by applying less force than would be necessary if medial segments 512 had not been pre-stressed beyond their elastic limits.

As in the other embodiments, deformable member 500 is preferably disposed within cushion 540, but may also be disposed between cushion 540 and base 550 (not shown), or disposed within and/or around base 550.

Figure 6:
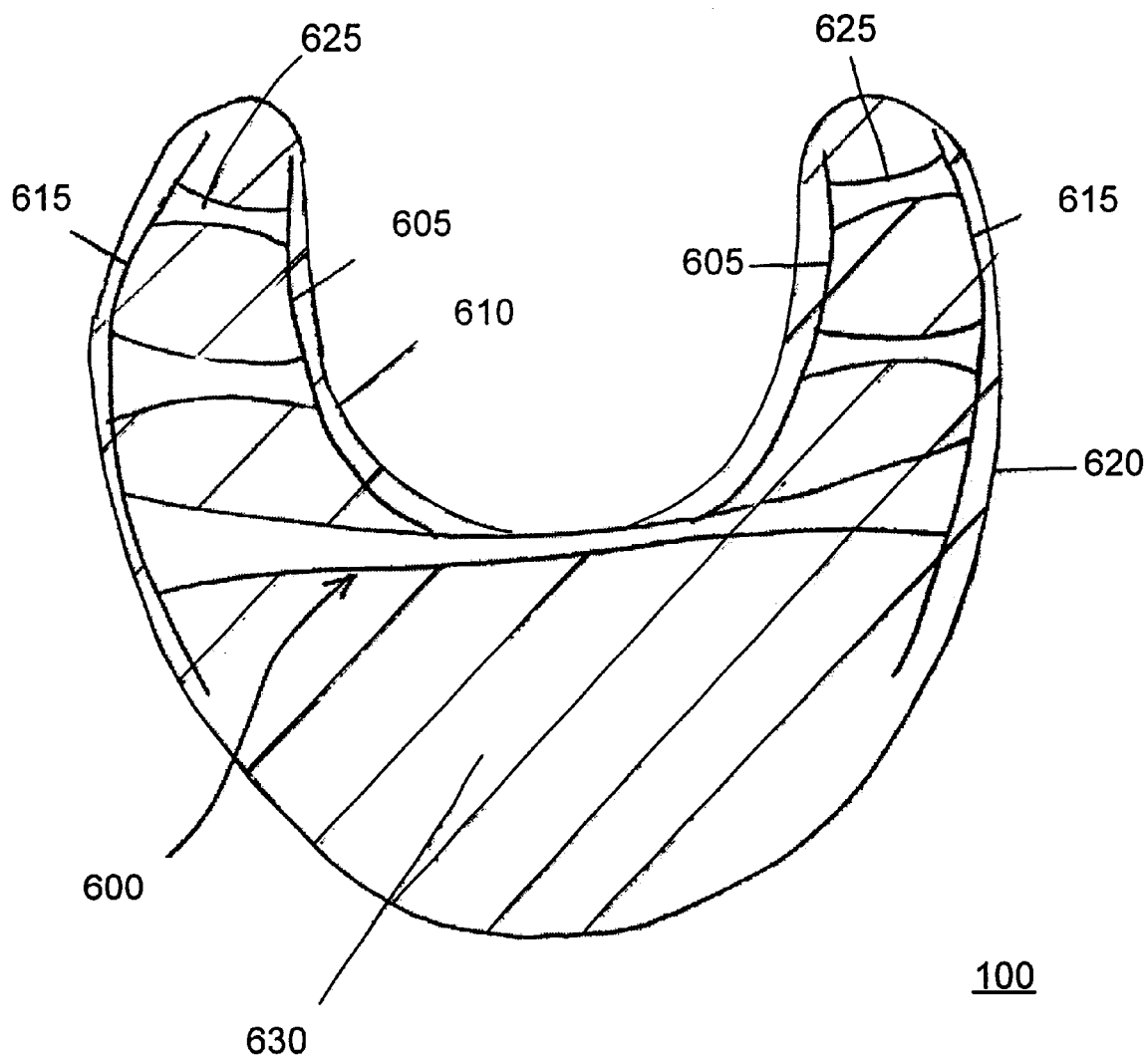
FIG. 6 is a cross-section of a fourth embodiment of the present invention.

FIG. 6 illustrates another embodiment of support 100 which is suitable for all types of deformable member 600 but particularly advantageous if deformable member 600 is made of a shape memory polymer or resin. Here, deformable member 600 includes interior segments 605, which are disposed along at least a part of concave portion 610, and exterior segments 615, which are disposed along at least part of convex portion 620.

Medial segments 625 connect interior segments 605 and exterior segments 510 and/or may extend from one exterior segment 510 to the other. Although five medial segments 625 are shown in FIG. 6, this number is purely illustrative; any convenient number of medial segments 625 may be used. Medial segments 625 may be formed in any convenient shape, but are preferably thinner in the middle to allow easier deformation. If a shape memory polymer or resin is used to form deformable member 600, medial segments 625 may be easily formed into various shapes. Exemplary shapes of medial segments 625 are illustrated in FIG. 6. Here, medial segments 625 are thinner in the middle and have cross-sectional shapes similar to concave lenses.

As in the other embodiments, deformable member 600 is preferably disposed within cushion 630, but may also be disposed between cushion 630 and basal portion 650 (not shown), positioned around basal portion 650, and/or embedded in basal portion 650.

Figure 7:
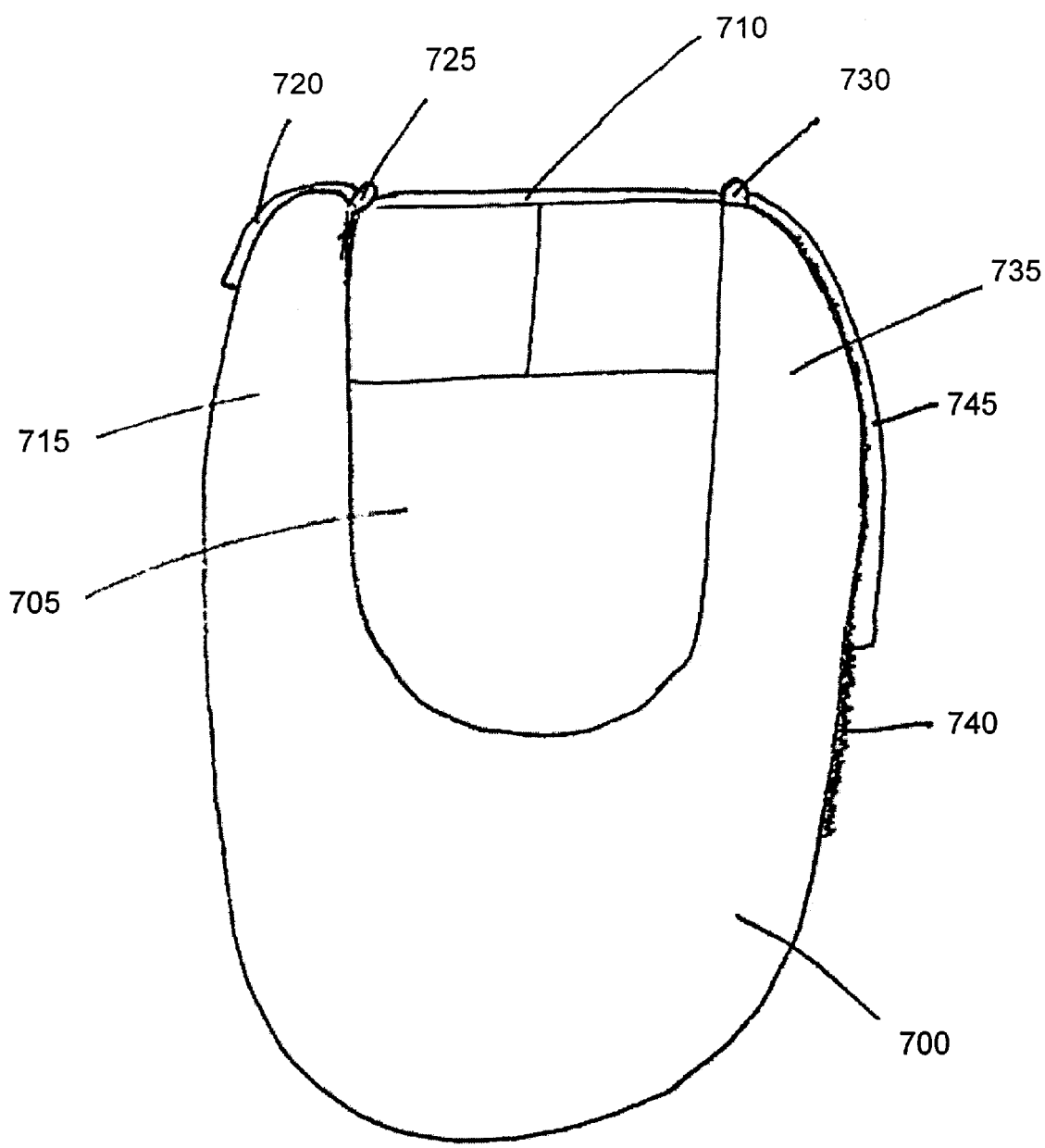
FIG. 7 is a top view of a fifth embodiment of the present invention.

The present invention is not limited to supports which require internal deformable members, but includes other means for securing a support to an input device. For example, FIG. 7 illustrates support 700, which may be dynamically conformed to a wide variety of input devices 705 by the use of attachment member 710. In one preferred embodiment, attachment member 710 is an elastic strap which includes fixed portion 720 and removable portion 745. Fixed portion 720 is secured to first lobe 715 of support 700 and removable portion 745 may be secured to second lobe 735 in various positions, according to the size of input device 705. Attachment member 710 passes through loop 725, which is affixed to first lobe 715, and through loop 730, which is affixed to second lobe 735.

In one preferred embodiment, removable portion 745 is adjustably secured to second lobe 735 by a "loop and hook" fastener, such as VELCRO™. One portion of the fastener is surface 740, which is disposed on second lobe 735, and the other portion of the fastener is disposed on removable portion 745.

However, in alternative embodiments, attachment member 710 may be adjustably secured in a variety of ways, including one or more snaps, buckles, buttons, pull-ties, or similar devices. Attachment member 710 need not be elastic and need not be a strap, but may be formed of one or more cords, webs, chains, bands, or the like. Moreover, attachment member may have more than one removable portion. Loops 725 and 730 are optional in most embodiments.

Figure 8:
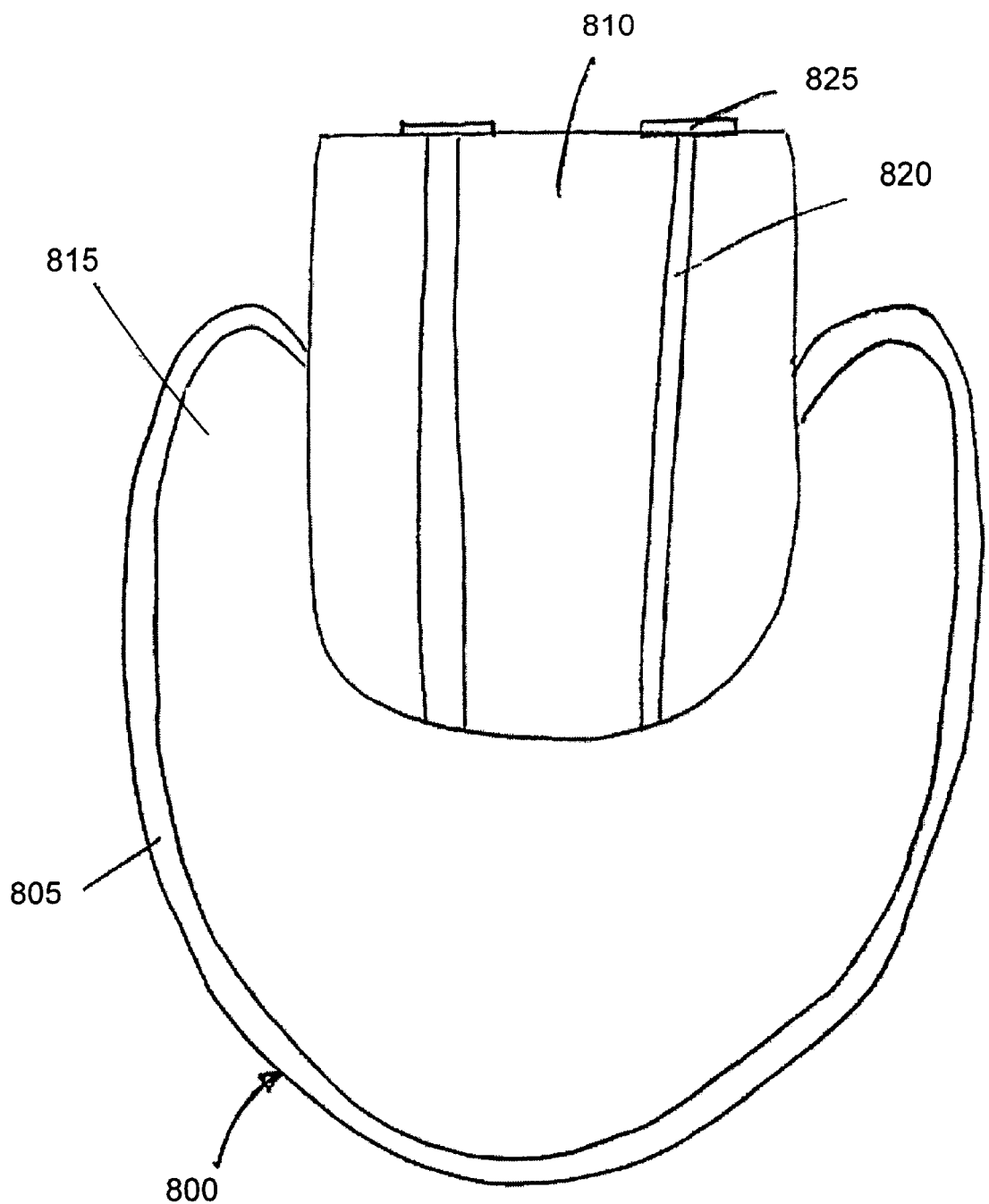
FIG. 8 is a bottom view of a sixth embodiment of the present invention.

FIG. 8 illustrates another embodiment which does not require an internal deformable member to secure an input device and which is particularly suitable for input devices which do not use a trackball, such as optical input devices. FIG. 8 depicts the underside of support 800, which is dynamically conformed to input device 810 by one or more attachment members 820, which include couplings 825. The edges of cushion 805 may be seen protruding around base 815. Attachment members 820 are preferably made of elastic material in order to apply a compressional force to input device 810, thereby securing it to support 800. However, attachment members 820 need not be elastic, but can be secured by sliding couplings 825 to positions which engage input device 810. Alternatively, tension could be applied to attachment members 820 by a spring or similar device disposed within base 815 or another portion of support 800.

Figure 9:
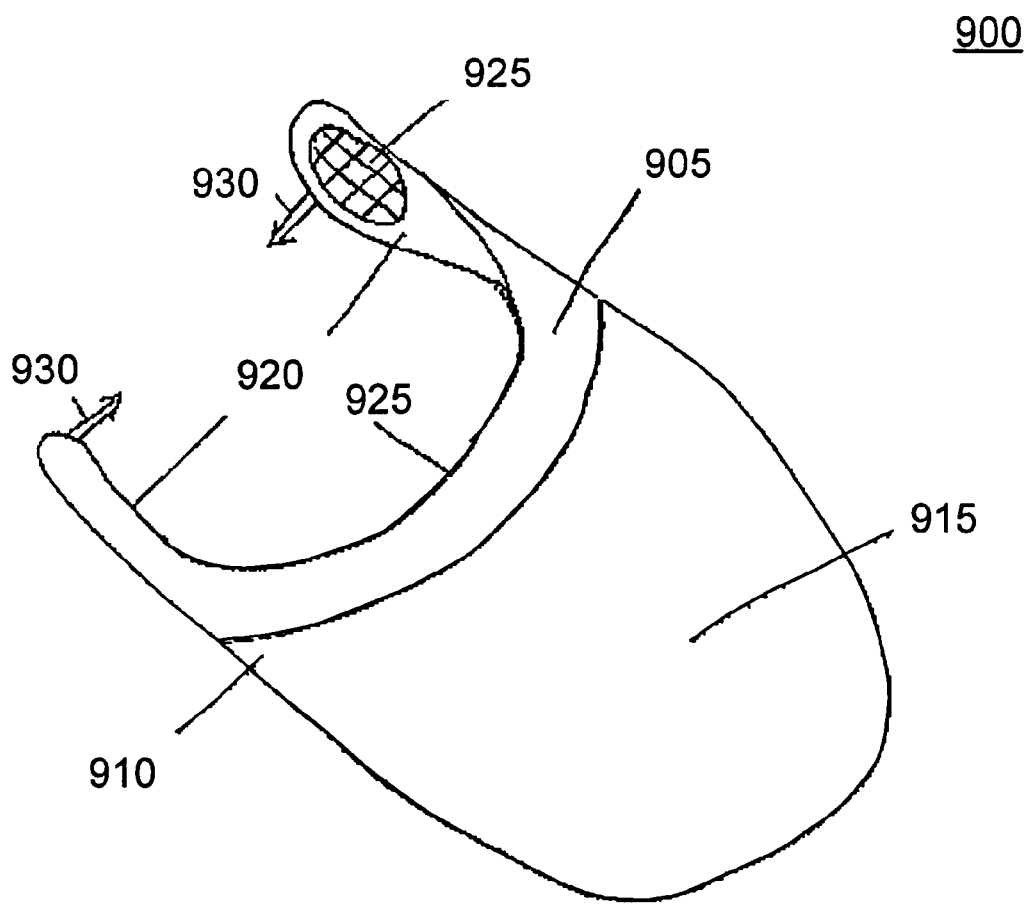
FIG. 9 is an illustration of a seventh embodiment of the present invention.

FIG. 9 illustrates another preferred embodiment of the present invention. In this embodiment, mouse cradle 900 includes skeleton 905, which provides a support structure for cover 910 and creates a cavity for cushion 915. Skeleton 905 includes grip portions 920. In one preferred embodiment, grip portions 920 are pushed outwards when a mouse (not shown) is inserted into recessed area 925. In an alternative embodiment which is advantageous for narrower mice, a user places a mouse into recessed area 925, then presses grip portions 920 against the mouse. In either case, grip portions 920 exert forces 930 against the mouse. The frictional force between grip portions 920 and the mouse is increased by grip pads 925, which are preferably disposed on both of grip portions 920. Grip pads 925 may also be positioned on other portions of mouse cradle 900 which come in contact with the mouse.

In one embodiment, mouse cradle 900 is approximately 60 to 75 mm in width, 115 to 130 mm in length, and 35 to 45 mm in height. In the same embodiment, recessed area 925 (including grip portions 920) is approximately 60 to 75 mm in width, 115 to 130 mm in length, and 35 to 45 mm in height. In this embodiment, the covered portion of mouse cradle 900 is approximately 60 to 70 mm in width, 65 to 70 mm in length, and 30 to 40 mm in height.

Skeleton 905 may be made of any convenient deformable material. In one preferred embodiment, skeleton 905 is made of PC. In other embodiments, skeleton 905 is made of metal, graphite, ABS, PVC, PP, styrene, acrylic, nylon, a shape memory alloy such as nickel-titanium, or a shape memory resin or polymer such as polynorbomene, trans-1, 4-polyisoprene, or polyurethane.

Cover 910 is preferably formed of a material which "breathes" and is pleasant for a user to touch, such as lycra, leather (synthetic or real), neoprene, vinyl, cotton, velvet, nylon, or Jersey cloth. However, in some embodiments cover 910 is not used.

In one preferred embodiment, cushion 915 is formed of polyurethane gel. However, cushion 915 may be formed of any cushioning material, such as foam or other types of gel, and may or may not be resilient. For example, cushion 915 may be made of common dampening foam (low and high density), SBR (styrene-butadiene), and PVC (polyvinyl chloride). In other embodiments, cushion 915 is firm. In firm embodiments, cushion 915 may be filled with material such as sand, metal filings, grains, beans, clay or similar material. In some "firm" embodiments, the material used to make skeleton 905 is also used to make cushion 915.

Grip pads 925 are preferably made of material which has a high coefficient of friction, such as an elastomer (e.g., SBR—styrene-butadiene, neoprene, and urethane) TPR (thermoplastic rubber) or rubber. Although grip pads 925 are shown attached to inner surfaces of grip portions 920, in some embodiments grip pads 925 are positioned in recesses which are formed in grip portions 920. In some such embodiments, grip pads 925 are positioned in holes which are formed through grip portions 920. In some such embodiments, grip pads 925 are formed to be replaceable with different sized pads. In other embodiments, grip pads 925 are unnecessary, because skeleton 905 is made from a material with a sufficiently high coefficient of friction.

Figure 10:
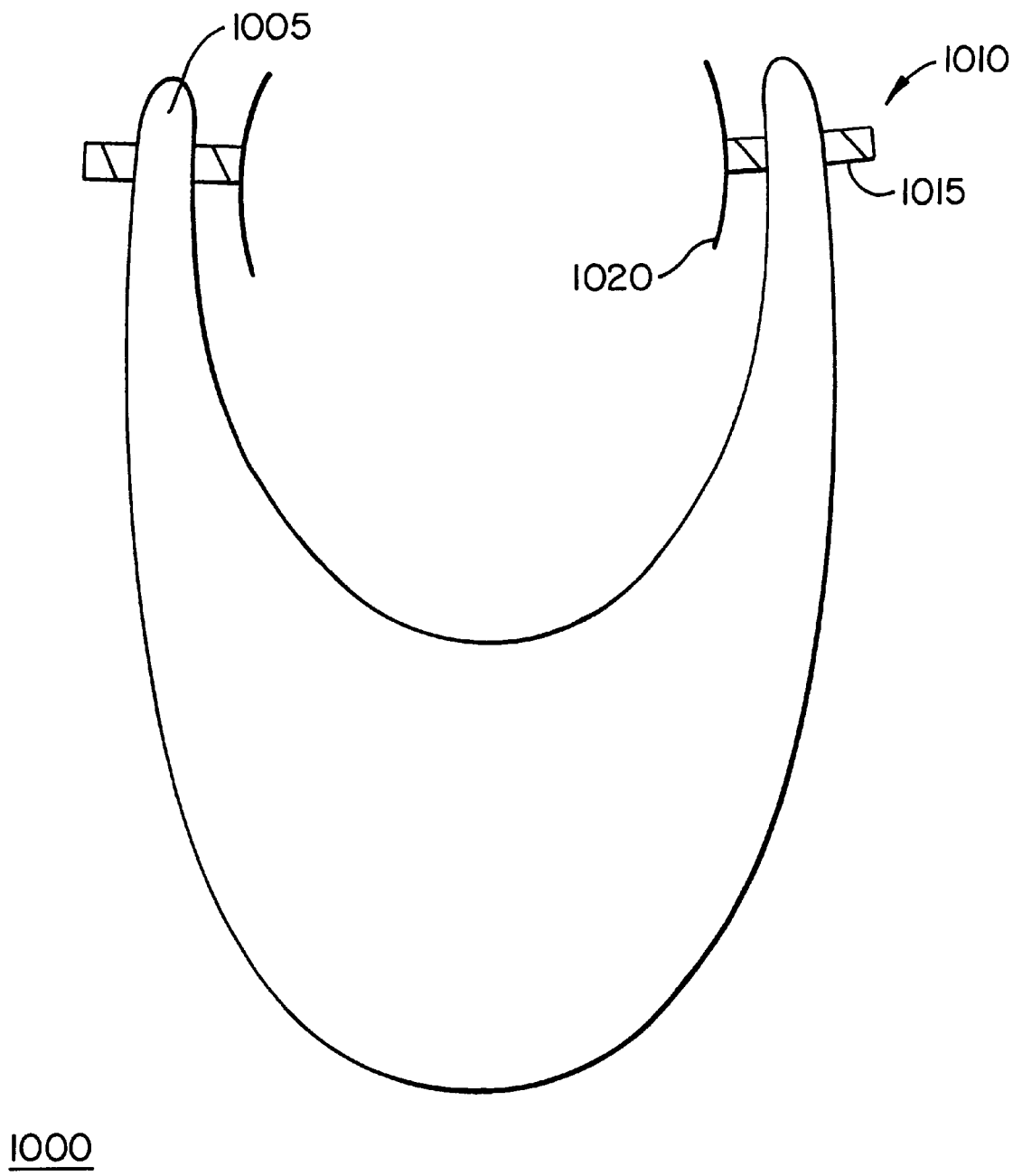
FIG. 10 is an illustration of an eighth embodiment of the present invention.

In FIG. 10, grip portions 1005 have openings 1007 which adjustably accommodate engagement members 1010. In the embodiment shown in FIG. 10, engagement members 1010 are threaded and include pads 1020 which contact an input device after engagement members 1010 have been adjusted to hold the input device in place. In this embodiment, engagement members 1010 may be adjusted by rotating engagement members 1010 in openings 1007 in the same manner that a screw is advanced through a nut or other orifice. In some embodiments, openings 1007 are also threaded. However, some embodiments of engagement members 1010 are not threaded and some embodiments do not include pads 1020.

Figure 11:
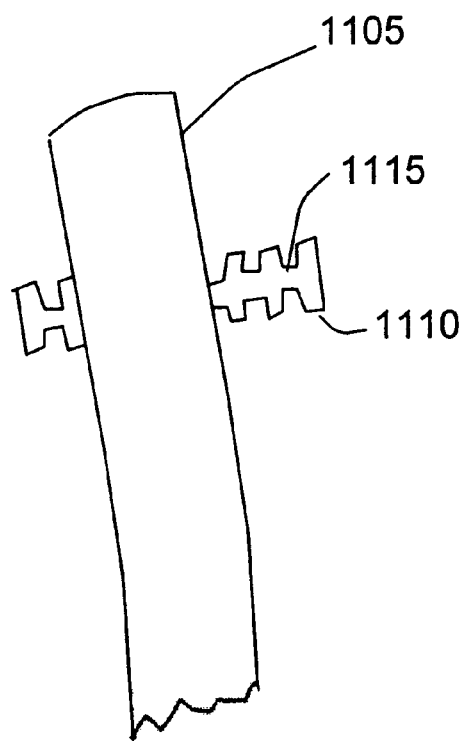
FIG. 11 is an illustration of a ninth embodiment of the present invention.

FIG. 11 illustrates grip portion 1105, which includes a hole through which engagement member 1110 is fitted. Instead of threads, engagement member 1110 features indentations 1115 for positioning engagement member 1110 in a variety of positions with respect to grip portion 1105. In one preferred embodiment, engagement member 1110 is deformable to more easily enable a snug fit between engagement member 1110 and an input device.

Figure 12A:
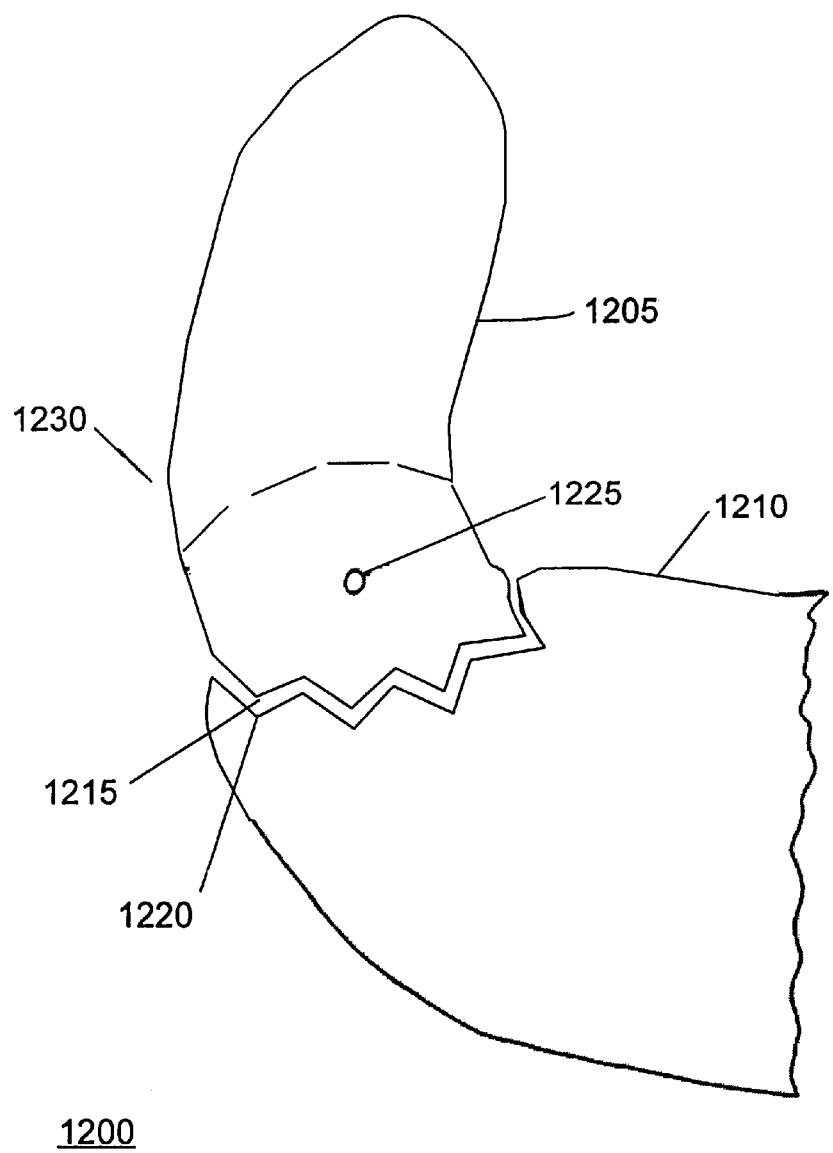
FIG. 12A is a top view of an tenth embodiment of the present invention.
Figure 12B:
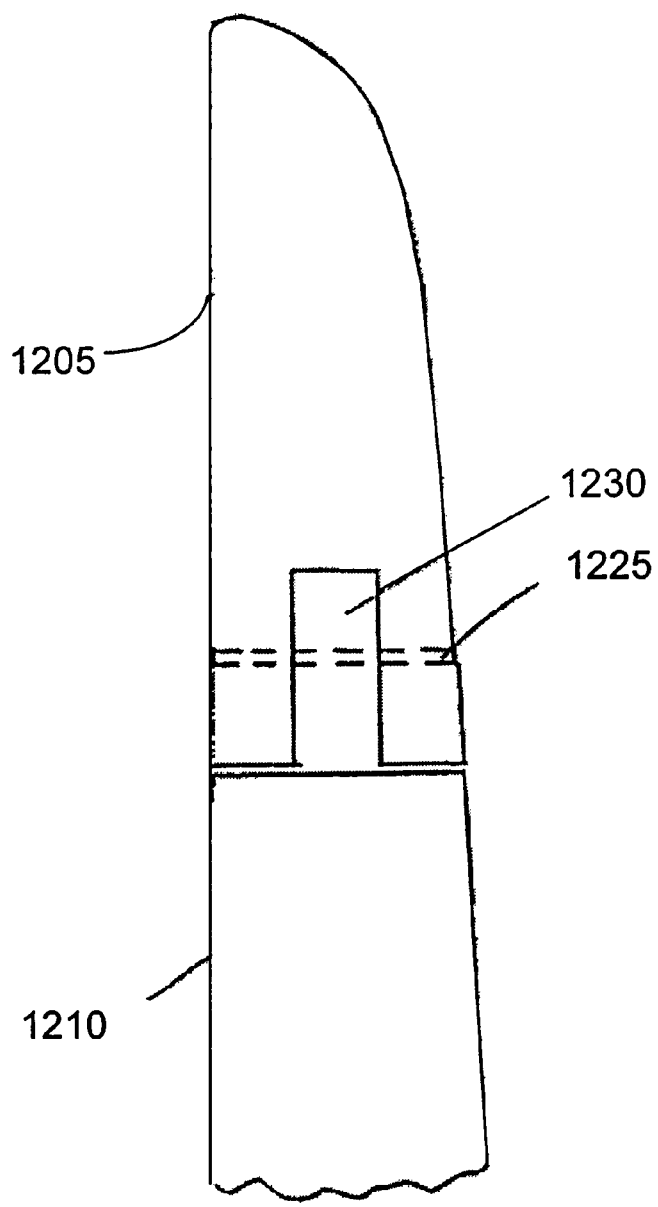
FIG. 12B is a side view of an eleventh embodiment of the present invention.

FIG. 12A illustrates an embodiment in which the orientation of grip portions 1205 with respect to main portion 1210 may be changed by rotating one or both of grip portions 1205. Teeth 1215 are formed to engage with recesses 1220 in order to securely maintain grip portions 1205 in various positions with respect to main portion 1210. In the embodiment shown in FIGS. 12A and 12B, pin 1225 extends through grip portion 1210 and extension 1230 of main portion 1210, thereby allowing grip portion 1205 to rotate around pin 1225.

While the best modes for practicing the invention have been described in detail, those of skill in the art will recognize that there are numerous alternative designs, embodiments, modifications and applied examples which are within the scope of the present invention. Accordingly, the scope of this invention is not limited to the previously described embodiments.

We claim:

1. A support for use with a computer input device, comprising:
    deformable support means for supporting a user's hand; and
    shape retention means for coupling the support means to the computer input device by force which continues to be applied to the computer input device after the shape retention means is deformed from a first shape to a second shape.

2. The support of claim 1, wherein the shape retention means comprises a metal strip.

3. The support of claim 1, wherein the shape retention means comprises a shape memory resin.

4. The support of claim 1, wherein the shape retention means comprises a shape memory alloy.

5. The support of claim 1, wherein at least part of the shape retention means is disposed within the support means.

6. The support of claim 1, wherein a portion of the shape retention means is disposed between the support means and the input device.

7. The support of claim 1, wherein a portion of the shape retention means is disposed along a convex surface of the support means.

8. The support of claim 1, wherein the shape retention means comprises a material selected from the group consisting of graphite, polycarbonate, ABS, PVC, polypropylene, styrene, acrylic and nylon.

9. The support of claim 1, wherein the support means comprises a base.

10. The support of claim 1, wherein the shape retention means comprises at least one pre-stressed portion.

11. The support of claim 1, further comprising friction means for developing a frictional force between the support and the computer input device.

12. The support of claim 9, wherein at least part of the shape retention means is disposed between the support means and the base.

13. The support of claim 9, wherein at least part of the shape retention means is disposed within the base.

14. The support of claim 9, wherein at least part of the shape retention means is disposed around the base.

15. The support of claim 11, wherein the friction means comprises a cover disposed on a surface of the support means.

16. The support of claim 11, wherein the friction means comprises a material selected from the group consisting of rubber, leather, elastomers and thermoplastic rubber.

17. A support for use with a computer input device, comprising:
    a cushion;
    a metal strip for coupling the cushion to the computer input device by force which continues to be applied to the computer input device after the metal strip is deformed from a first shape to a second shape; and
    a gripping surface disposed between at least a portion of the metal strip and the computer input device, the gripping surface applying friction to the computer input device.

18. The support of claim 17, wherein at least a portion of the metal strip is disposed within the cushion.

19. The support of claim 17, wherein at least a portion of the metal strip is disposed between the cushion and the input device.

20. The support of claim 17, wherein the metal strip is disposed around at least a portion of the cushion.

21. The support of claim 17, wherein the cushion comprises a material selected from the group consisting of gel, foam, polyurethane, low-density dampening foam, high-density dampening foam, styrene-butadiene, polyvinyl chloride, sand, metal filings, grains, beans and clay.

22. The support of claim 17, wherein the surface comprises a material selected from the group consisting of rubber, leather, elastomers and thermoplastic rubber.

23. The support of claim 17, further comprising a base for supporting the cushion.

24. The support of claim 17, wherein the metal strip comprises at least one pre-stressed portion.

25. The support of claim 23, wherein at least part of the metal strip is disposed within the base.

26. The support of claim 23, wherein at least part of the metal strip is disposed around the base.

27. A support for use with a computer input device, comprising:
   a cushion;
   a deformable member for coupling the cushion to the computer input device by continuing to exert force on the computer input device after the deformable member has been deformed;
   a base for supporting the cushion and deformable member, the base comprising a first surface for providing a low-friction interface between the support and a work area; and
   a second surface for applying frictional force to the computer input device, at least a portion of the second surface being disposed between the deformable member and an area for receiving the computer input device.

28. The support of claim 27, wherein at least part of the deformable member is disposed within the cushion.

29. The support of claim 27, wherein the deformable member comprises a shape memory material.

30. The support of claim 27, wherein the deformable member comprises a material selected from the group consisting of aluminum, tin, copper, steel, magnesium, titanium, graphite, polycarbonate, ABS, PVC, polypropylene, styrene, acrylic and nylon.

31. The support of claim 27, wherein the deformable member comprises at least one pre-stressed portion.

32. The support of claim 27, wherein the first surface comprises a material selected from the group consisting of polycarbonate, Teflon™, vinyl, acrylic and plastic.

33. The support of claim 27, wherein the second surface comprises a material selected from the group consisting of rubber, leather, elastomers and thermoplastic rubber.

34. The support of claim 27, wherein at least part of the deformable member is disposed between the cushion and the first surface.

35. The support of claim 27, wherein at least part of the deformable member is disposed between the cushion and the second surface.

36. The support of claim 27, wherein at least part of the deformable member is disposed within the base.

37. The support of claim 27, wherein at least part of the deformable member is disposed around the base.

38. A support for use with a computer input device, comprising:
   a recessed area for receiving the computer input device;
   a first lobe which defines a first side of the recessed area;
   a second lobe which defines a second side of the recessed area;
   an attachment member for attaching the first lobe to the second lobe without connecting the attachment member directly to the computer input device, thereby securing the computer input device within the recessed area; and
   a fixed portion attached to the first lobe and a removable portion which is removably attached to the second lobe.

39. The support of claim 38, wherein the attachment member is formed of an elastic material.

40. The support of claim 38, wherein the removable portion is configured to be attached to the second lobe by a loop and hook fastener.

41. A support for use with a computer input device which is configured to be moved on a work surface, the support comprising:
   a recessed area for receiving the computer input device;
   an attachment member for extending along a side of the computer input device which is configured to face the work surface and for gripping the computer input device, thereby coupling the computer input device to the recessed area; and
   tensioning means for applying tension to the attachment member.

42. The support of claim 41, wherein the attachment member is formed of elastic material.

43. A method of forming a customized fit between an ergonomic support and a computer input device, comprising the steps of:
   positioning a portion of the ergonomic support proximate to the computer input device; and
   applying force to the ergonomic support to form it into a shape in conformity with a portion of the computer input device.

44. The method of claim 43, wherein after the ergonomic support has been formed into a shape in conformity with a portion of the computer input device, the ergonomic support is secured to the computer input device by a frictional force between the ergonomic support and the computer input device.

45. The method of claim 43, further comprising the step of shaping the ergonomic support in conformity with at least a portion of a user's hand.

46. A method of forming a customized fit between a computer input device and an ergonomic support which comprises a deformable member having a glass transition point, the method comprising the steps of:
   heating the deformable member to a temperature above its glass transition point;
   positioning a portion of the ergonomic support proximate to the computer input device;
   applying force to the ergonomic support to form the deformable member into a shape in conformity with a portion of the computer input device; and
   cooling the deformable member to a temperature below its glass transition point.

47. The method of claim 46, further comprising the step of reheating the deformable member to a temperature above its glass transition point.

48. A support for use with a computer input device comprising:
   a recessed area for receiving the computer input device,
   a first lobe which defines a first side of the recessed area;
   a second lobe which defines a second side of the recessed area;
   an engagement member adjustably fitted to an opening in the fist lobe wherein the engagement member is moved through the opening to engage the input device; and
   the engagement member is threaded.

49. A support according to claim 48, wherein the engagement member comprises:
   a first indentation;
   a second indentation; and
   a raised area separating the first indentation and the second indentation, wherein the first indentation is not connected to the second indentation.

50. A support for use with a computer input device, comprising:

a recessed area for receiving the computer input device;

a first lobe which defines a first side of the recessed area;

a second lobe which defines a second side of the recessed area;

a main portion which is engaged with the first lobe and adjustably engaged with the second lobe by means of a first set of teeth on the main portion which engage with a second set of teeth on the second lobe.

51. A support for use with a computer input device comprising:

a recessed area for receiving the computer input device:

a first lobe which defines a first side of the recessed area;

a second lobe which defines a second side of the recessed area;

an engagement member adjustably fitted to an opening in the fist lobe wherein the engagement member is moved through the opening to engage the input device; and the opening is threaded.

* * * * *